Figure 1:
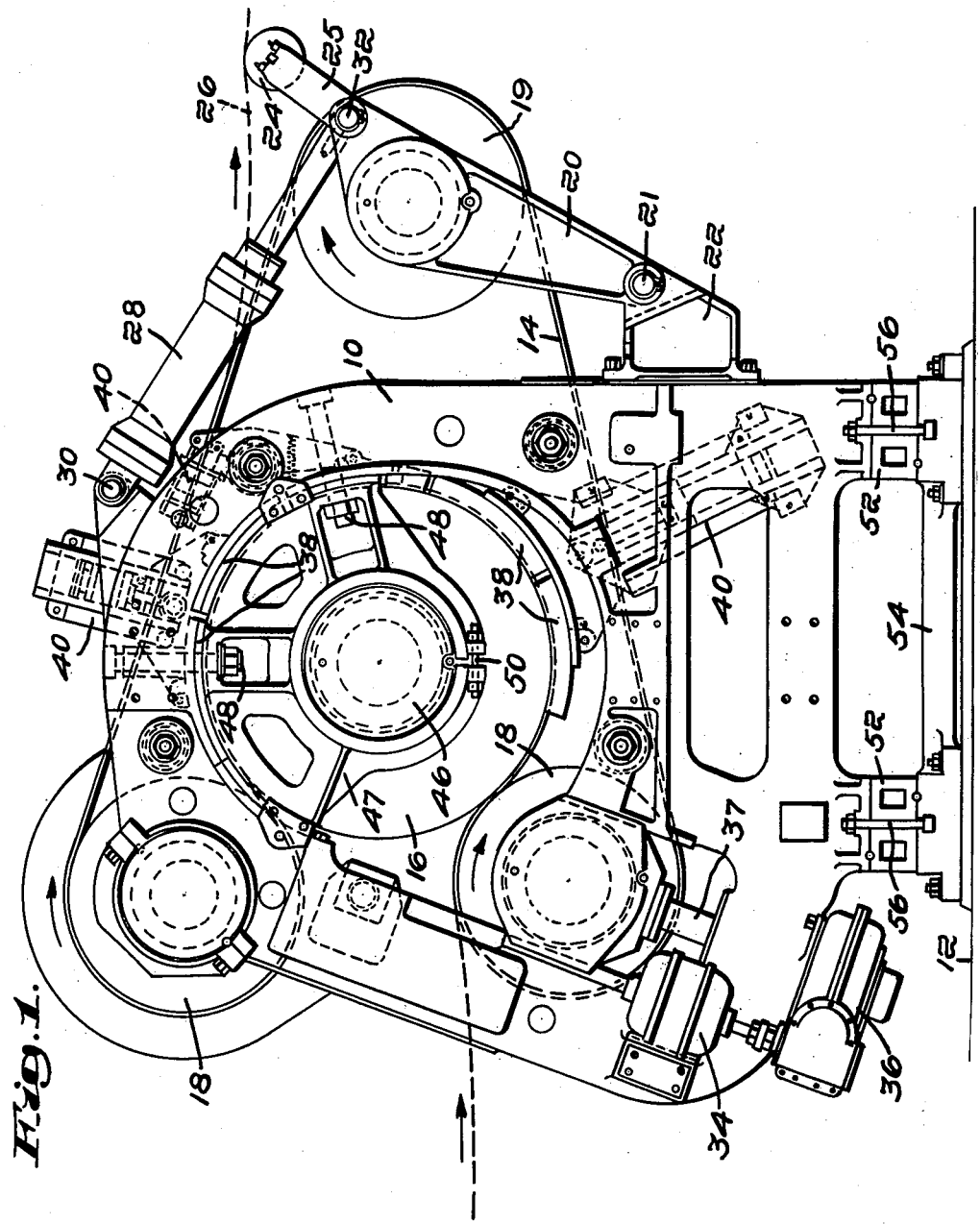

April 8, 1952  G. E. APEL ET AL  2,591,995
VULCANIZING MACHINE
Filed Sept. 23, 1949  5 Sheets-Sheet 1

Inventors:
George E. Apel,
Don F. Collins,
by Kenway, Jenney, Witter & Hildreth
Attorneys April 8, 1952   G. E. APEL ET AL   2,591,995
VULCANIZING MACHINE
Filed Sept. 23, 1949   5 Sheets-Sheet 2
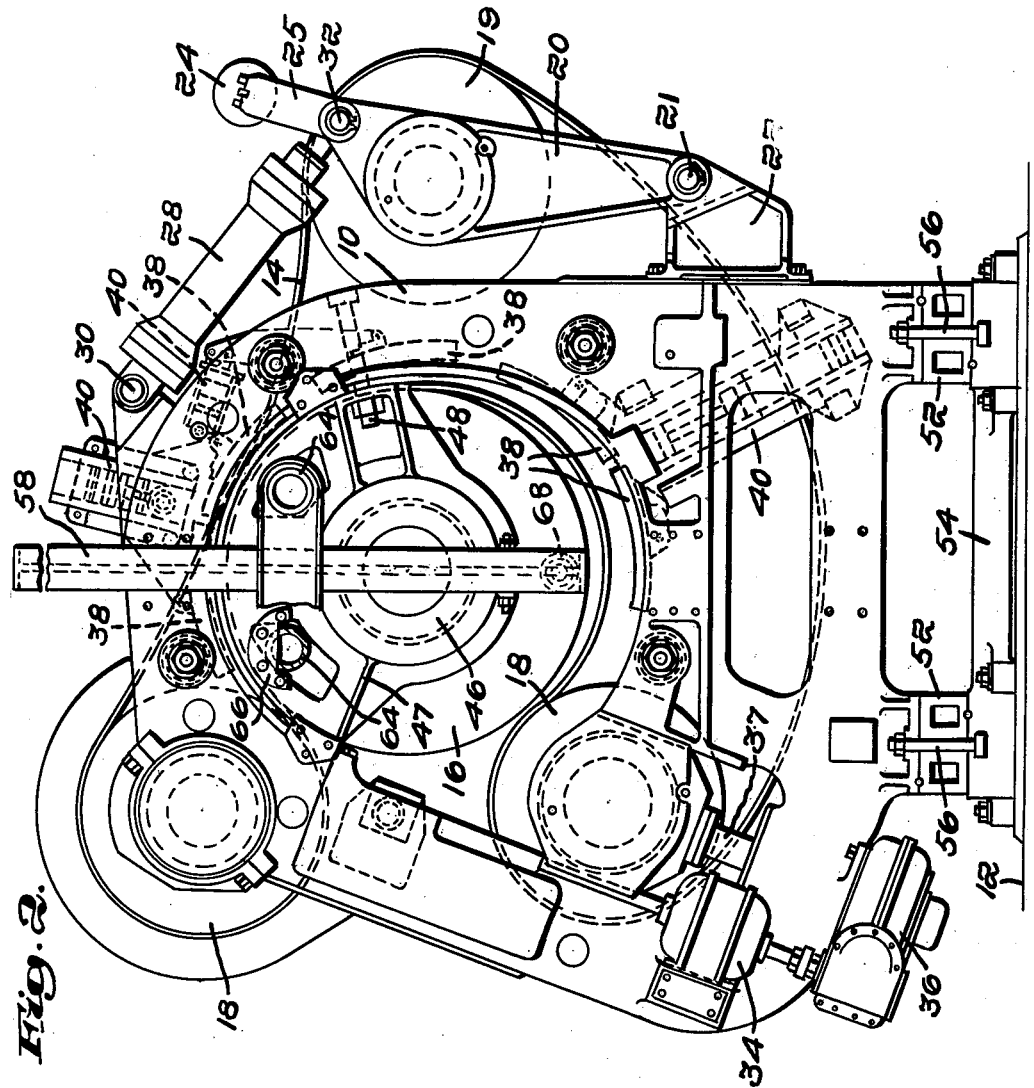
Inventors:
George E. Apel,
Don F. Collins,
by Kenway, Jenney, Witter & Hildreth
Attorneys

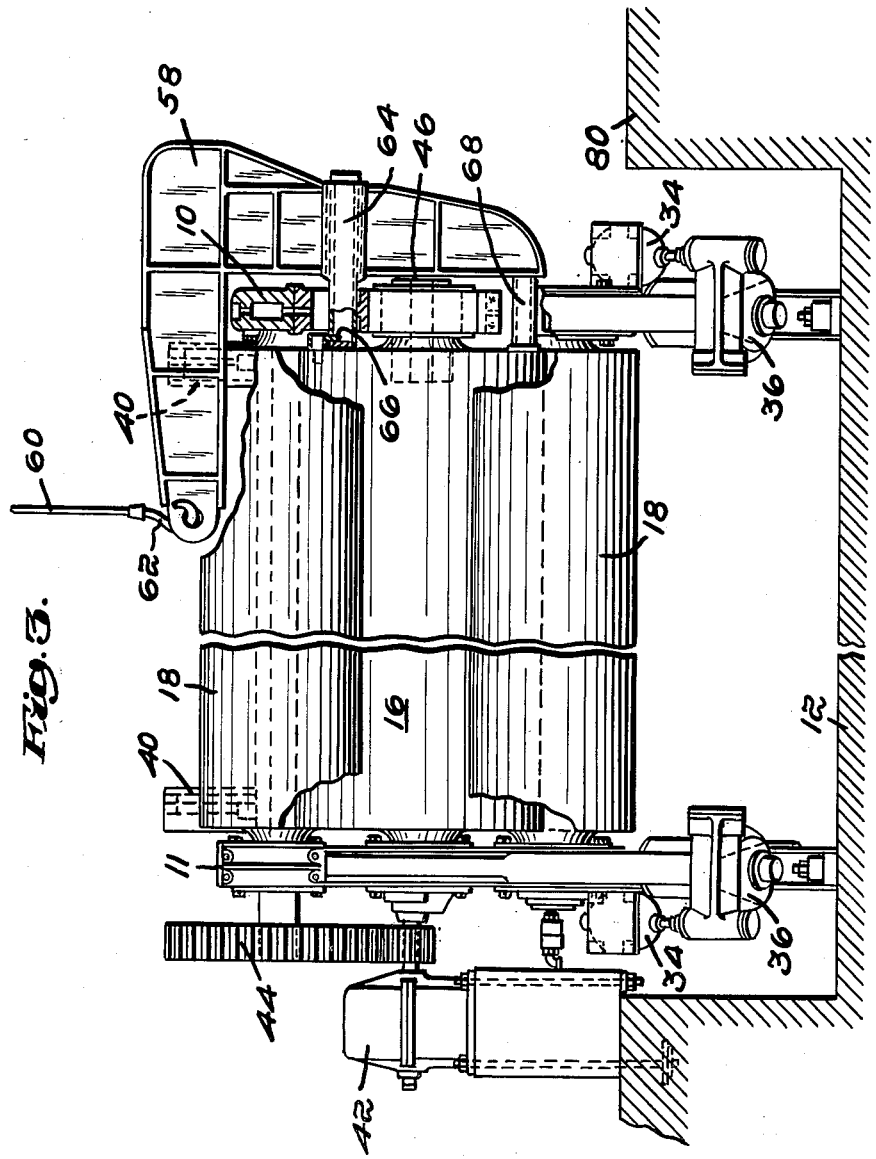

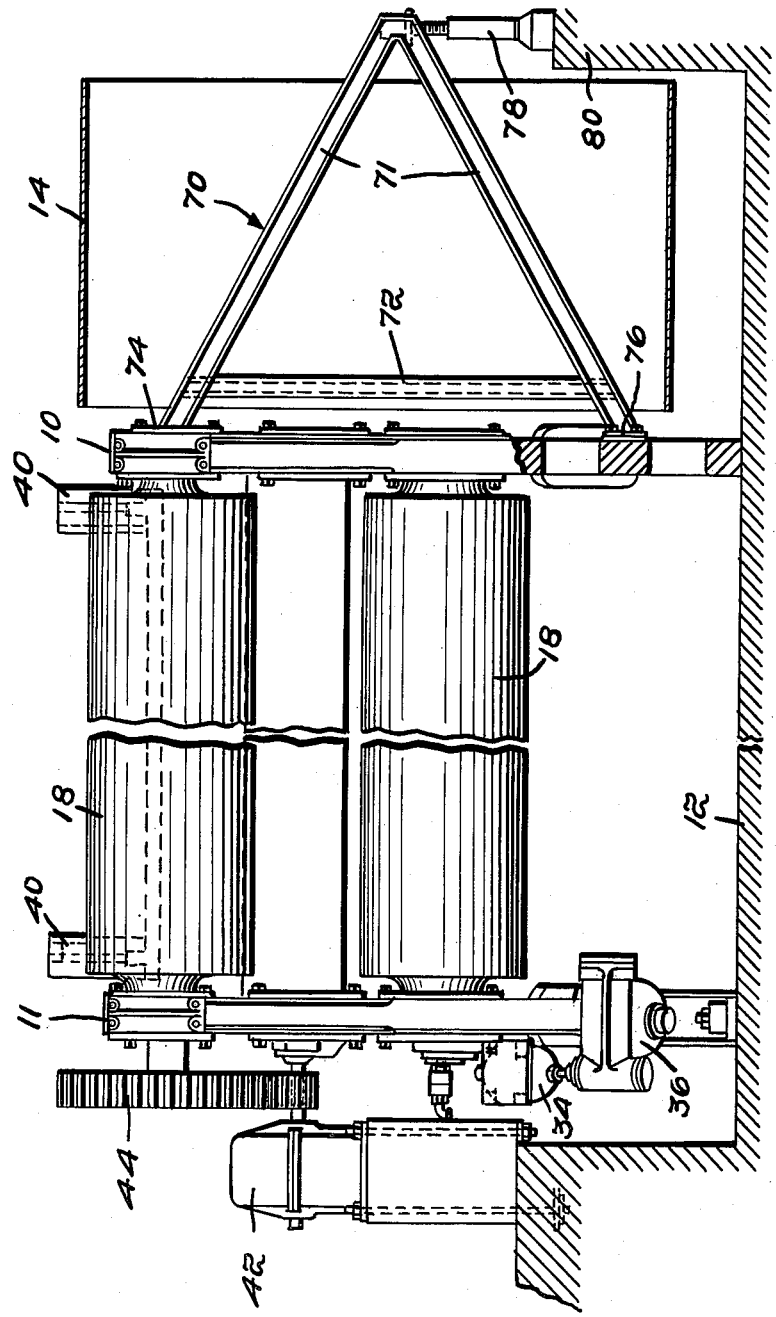

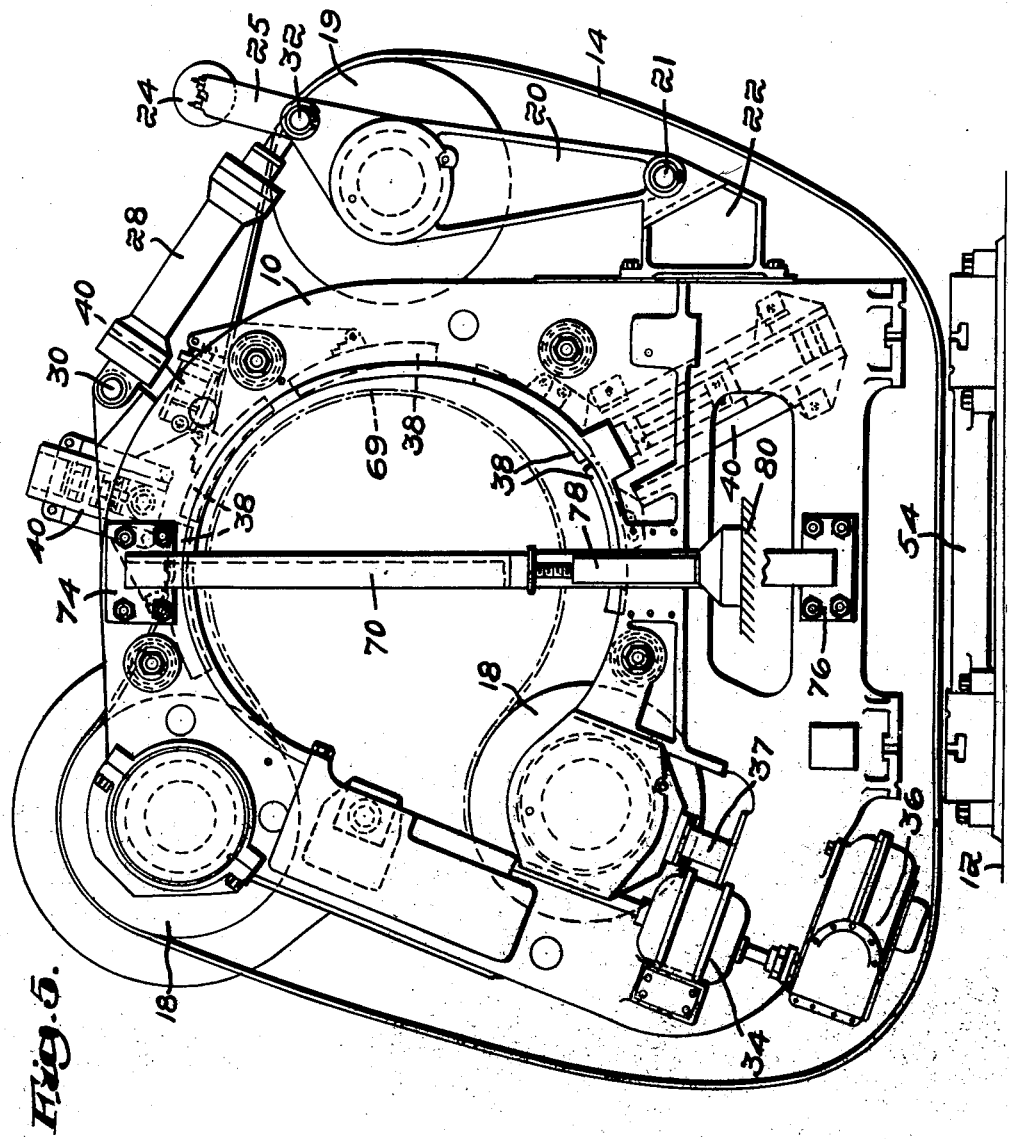

Patented Apr. 8, 1952

2,591,995

UNITED STATES PATENT OFFICE 2,591,995

VULCANIZING MACHINE

George E. Apel, Belmont, Mass., and Don F. Collins, Pontiac, Mich., assignors to Boston Woven Hose and Rubber Company, Cambridge, Mass., a corporation of Massachusetts Application September 23, 1949, Serial No. 117,432

5 Claims. (Cl. 18—6)

This invention relates to vulcanizing machines of the continuous vulcanizing type and employing a vulcanizing drum which cooperates with an endless pressure band, the material to be vulcanized being continuously passed through the machine between and in pressure contact with the pressure band and the arcuate surface of the drum. The drum is heated to vulcanizing temperature as is also the band, the latter being heated by heating jackets held in surface contact therewith.

The machine is of heavy construction and embodies front and rear side frames rotatably supporting the vulcanizing drum at its ends and also a plurality of rolls for supporting the endless band for movement in a path about the drum and including a tensioning roll for tightening the band into pressure contact with the drum. The band is relatively wide and constructed of sheet steel, and the drum and rolls are of substantial length and of considerable weight. Occasionally, it becomes necessary to remove or change the drum and/or band and heretofore this operation has required a complete disassembling of the entire machine. The primary object of the present invention resides in the production of an improved construction whereby the vulcanizing drum and/or pressure band can be removed or changed without disassembling the machine.

Briefly, the invention is embodied in novel power operated mechanism cooperating with the band tensioning roll for moving it to either band tensioning position or in the opposite direction to a position leaving the band slack relative to the drum and rolls, drum supporting mechanism permitting detachment of the drum from the frame, and removable frame supporting blocks permitting removing of the endless pressure band from the frame.

When the drum is to be removed it is supported from one end independently of the frame and removed endwise from the frame after being detached therefrom. If the pressure band is also to be removed, the weight of the frame over the removable blocks is supported independently of the base and the blocks removed, after which the band is removed from the frame through the space normally occupied by the removable blocks. These steps and the interchanging of another drum and band in the frame for those removed therefrom are hereinafter more specifically described. The production of novel and improved mechanism for effecting these changes comprises the primary object of the invention.

These and other features of the invention will be best understood and appreciated from the following description of a preferred embodiment thereof selected for purposes of illustration and shown in the accompanying drawings in which—

Fig. 1 is a front side elevation of a vulcanizing machine embodying the invention and illustrating the pressure band tensioned to working position, Fig. 2 is a like view showing the pressure band slack and cooperating mechanism for supporting the drum independently of the machine frame, Fig. 3 is a front end elevation of the machine shown in Fig. 2, Fig. 4 is a front elevation of the machine and cooperating mechanism for supporting the front end portion of the frame forwardly thereof and independently of the base on which it normally rests, and Fig. 5 is a front end elevation of the mechanism shown in Fig. 4.

The heavy metal frame of the machine comprises front and rear side frames 10 and 11 of similar shape rigidly connected and supported on a concrete base 12. The frame is designed to support three rolls over which passes a relatively wide steel pressure band 14 in a generally triangular path with a reentrant loop extending about a substantial arcuate portion of a large vulcanizing drum or cylinder 16 supported by the frame within the general outline of the path of the band. Two of the band supporting rolls 18 are located adjacent to and forwardly of the vulcanizing drum, and a third band tensioning roll 19 is located rearwardly of the drum, the pressure band being supported on these rolls and engaging the drum.

The band tensioning roll 19 is rotatably supported at its ends on a pair of arms 20 pivoted at 21 to brackets 22 bolted to the front and rear side frames 10 and 11. An idler roll 24 is carried on the outer ends of two auxiliary arms 25 for supporting the vulcanized strip 26 as it leaves the pressure band. Power operated means including two cylinders 28 pivotally attached to the side frames at 30 and having pistons therein attached to the two arms 20 at 32 is provided for moving the arms outwardly of the frame to tension the band and inwardly thereof to render the band slack. The power mechanism is fluid pressure operated either pneumatically or hydraulically.

The lower roll 18 additionally serves as a pressure roll to compress the strip 26 between the band and drum. Two motors 34 located respectively at the ends of the roll operate through double reduction gearing and jack screws at 36 and 37 to move the roll toward and from the vulcanizing drum for this purpose. Steam heated shoes 38 are mounted for pressure contact with that portion of the band engaging the drum and power operated means including fluid pressure operated cylinders are provided at 40 for moving the shoes toward and from the band and drum. The machine is driven by a motor 42 through gearing 44 to the upper roll 18.

The front end of the vulcanizing drum is rotatably supported in a bearing 46 in a spider 47 detachably secured to the frame 10 by bolts 48. The front frame 10 has an opening therethrough in alignment with the drum sufficiently large to admit passage of the drum forwardly therethrough. The spider is split at its bottom portion and an adjusting bolt 50 is provided at the split for securing the bearing to the spider. A like spider and bearing construction is provided on the frame 11 for supporting the rear end of the drum. The frame 10 is supported on two removable blocks 52 resting on a base 54 on the concrete foundation 12, bolts 56 serving to secure these parts together.

The motor 42 drives the upper roll 18 and band 14 in the direction indicated by the arrow. The strip 26 to be vulcanized is fed into the bite between the band and drum at the lower roll 18 and is vulcanized as it passes about and in contact with the drum. The vulcanizing drum may have a pattern on its surface to be transferred to the strip and it is necessary to change drums when a different pattern is to be employed. The removal of the drum from the machine or the exchange of the drum in the machine for another drum is a considerable task since the drum weighs approximately 22,400 pounds and the other parts of the machine are correspondingly heavy, the entire machine weighing approximately 85,000 pounds. The removal and replacement of the endless steel pressure band 14 is also a considerable task which is facilitated and accomplished quite conveniently and more economically by the invention herein disclosed.

When the vulcanizing drum 16 is to be removed, the steam heated shoes 38 (usually five in number) are fully retracted to the position illustrated in Fig. 2. The band tensioning roll 19 is likewise retracted to a position leaving the band 14 slack as also shown in Fig. 2.

A drum engaging and supporting unit 58 carried by a cable 60 and a hook 62, suspended from an overhead monorail disposed over and longitudinally of the drum, is employed for supporting the drum. This unit is brought to the forward side of the machine and two laterally spaced tongues 64 carried by and projecting rearwardly from the vertical arm of the unit are extended through two openings in the front spider 47 and engaged beneath and with two drum lifting lugs 66 attached to and extending outwardly from the forward end of the drum. A strut 68 carried by and extending inwardly from the bottom end of the same arm of the unit is arranged to engage the end of the drum and take the counter-thrust load when the drum weight is taken by the cable. As shown in Fig. 2, the two drum-lifting tongues 64 and the drum-engaging strut 68 are arranged in a triangular pattern on the vertical arm of the unit and together balance the lifting force applied by the cable 60 to the horizontal arm of the unit.

When the cable has been raised sufficiently to take the weight of the drum from the frame 10, the bolts 48 are removed, thus freeing the spider 47 from the drum. The bolt 50 at the rear end of the drum is then loosened sufficiently to free the rear bearing 46 from its spider so that it can move forwardly with the drum. The unit 58, together with the drum, is then moved forwardly on the monorail, the front spider 47 with its bearing 46 and the rear bearing 46 remaining on the drum. The drum is thus moved forwardly on the monorail to any storage position desired.

Extra vulcanizing drums with the desired designs thereon are kept in storage with a bearing 46 on each rear end and a bearing 46 and spider 47 on each forward end, thus facilitating the placement of the drum in the machine. The drum to be replaced in the frame is brought to the machine on the monorail and installed by reversing the sequence of operations above described.

If and when the endless band 14 is to be removed or replaced, the vulcanizing drum is first removed as above described, the machine remaining otherwise intact. Removing of the drum releases the looped portion of the band, shown in broken lines at 69, so that it can be brought to the open position illustrated in full lines in Fig. 5.

An A-frame 70 embodying two V-legs 71 and a cross bar 72 is brought to the forward side of the machine and the base ends of the legs 71 are bolted to the frame 10 at 74 and 76, above and below the drum opening. A jack screw 78 on a support 80 is placed beneath the front V-end of the A-frame 70 and adjusted to a position taking the weight of the machine from the blocks 52. The bolts 56 and blocks 52 are then removed. The band 14 is then, by means of suitable overhead handling equipment, moved forwardly of and over the frame and through the openings previously occupied by the blocks 52, to a position (Fig. 4) between the jack screw and the frame 10.

The blocks 52 are then temporarily replaced, the jack screw and frame 70 removed, and the band transported to any position desired. The same or a substitute band is replaced on the machine by reversing the sequence of operations just described.

It will now be apparent that we have invented and herein disclosed a novel and economical apparatus for removing and replacing the vulcanizing drum and the endless steel pressure band from and on continuous vulcanizing machines of the nature illustrated and described and that the invention is of considerable value and importance in the art when repair or interchanging of these parts are required.

The method herein disclosed constitutes the subject-matter of our divisional application Ser. No. 167,864 filed June 13, 1950, and certain features of the vulcanizing machine itself are the subject-matter of our divisional application Ser. No. 252,862 filed October 24, 1951.

Having thus declared our invention what we claim as new and desire to secure by Letters Patent is:

1. In a vulcanizing machine embodying front and rear side frames, a cylindrical vulcanizing drum rotatably mounted at its ends in the frames, an endless pressure band cooperating with an arcuate portion of the drum, a plurality of rolls cooperating with the drum to support the band, and a spider detachably secured to the front side frame and providing a bearing rotatably supporting the front end of the drum; a drum lifting and supporting unit comprising a body having two arms disposed in a vertical plane coincident with the axis of the vulcanizing drum with one arm extending vertically forwardly of the spider and the other arm extending horizontally over the top of the drum, a drum engaging element and two drum lifting elements carried by the vertical arm and extending into contact with the drum, said engaging element being arranged in triangular relation with the two lifting elements and lifting means engaging the horizontal arm at a point over the drum.

2. A vulcanizing machine comprising front and rear side frames, a cylindrical vulcanizing drum rotatably mounted at its ends in the frames, the front frame having an opening therethrough in alignment with the drum sufficiently large to admit passage of the drum forwardly therethrough, an endless pressure band cooperating with an arcuate portion of the drum, a plurality of rolls supported in the frames and cooperating with the drum to support the band, a spider detachably secured to the front side frame in said opening and including a bearing rotatably supporting the front end of the drum, the spider having two openings therethrough above and respectively at opposite sides of the drum axis for receiving therethrough two drum lifting elements and the front end of the drum directly below said axis being exposed for the reception of a third drum lifting element, a base beneath the front side frame, and a plurality of removable blocks resting on the base and supporting the front side frame spaced above and relative to the base, said opening and detachable spider permitting removal of the drum forwardly through the opening while supported by said elements, and said removable blocks permitting removal of the pressure band forwardly from the machine when the front side frame is supported independently of the blocks and the blocks removed.

3. The vulcanizing machine defined in claim 2 plus means providing a support and bearing carried by the rear side frame for rotatably supporting the rear end of the drum and including means for releasing the bearing relative to the support for axial movement therefrom forwardly with the drum through said opening.

4. In a vulcanizing machine embodying front and rear side frames supported on a base, removable blocks supporting the front side frame on the base, an endless pressure band adapted to cooperate with an arcuate portion of a vulcanizing drum rotatably supported at its ends in the frames, the front frame having an opening therethrough to admit passage of the drum therethrough, and a plurality of rolls for cooperating with the drum to support the band; a weight supporting frame disposed in a vertical plane forwardly of said opening, means securing the weight supporting frame to said front side frame at vertically spaced points above and below said opening with the weight supporting frame extending forwardly therefrom to a remote load lifting position, and means at said position for effecting a lifting force on and supporting the weight supporting frame and front side frame, the pressure band being removable from the machine through openings provided by the removal of said removable blocks when the frames are thus supported.

5. The apparatus defined in claim 4 in which said weight supporting frame is a triangular A-frame with the base of its two legs secured to the front side frame at said points and the apex of the legs located at said lifting position.

GEORGE E. APEL.
DON F. COLLINS.

REFERENCES CITED

The following references are of record in the file of this patent:

UNITED STATES PATENTS

| Number | Name | Date |
| --- | --- | --- |
| 1,633,590 | Lamplough | June 28, 1927 |
| 1,948,491 | Brockway | Feb. 27, 1934 |
| 1,998,161 | Knowland | Apr. 16, 1935 |
| 2,039,271 | Bierer | Apr. 28, 1936 |
| 2,113,598 | Mueller | Apr. 12, 1938 |
| 2,181,859 | Baker et al. | Dec. 5, 1939 |
| 2,439,779 | Marcy | Apr. 13, 1948 |
| 2,442,443 | Swallow | June 1, 1948 |
| 2,470,262 | Payzer | May 17, 1949 |